Dec. 9, 1941.  W. ROBERTS ET AL  2,265,955
DOUBLE GLASS CUTTER
Filed March 20, 1939
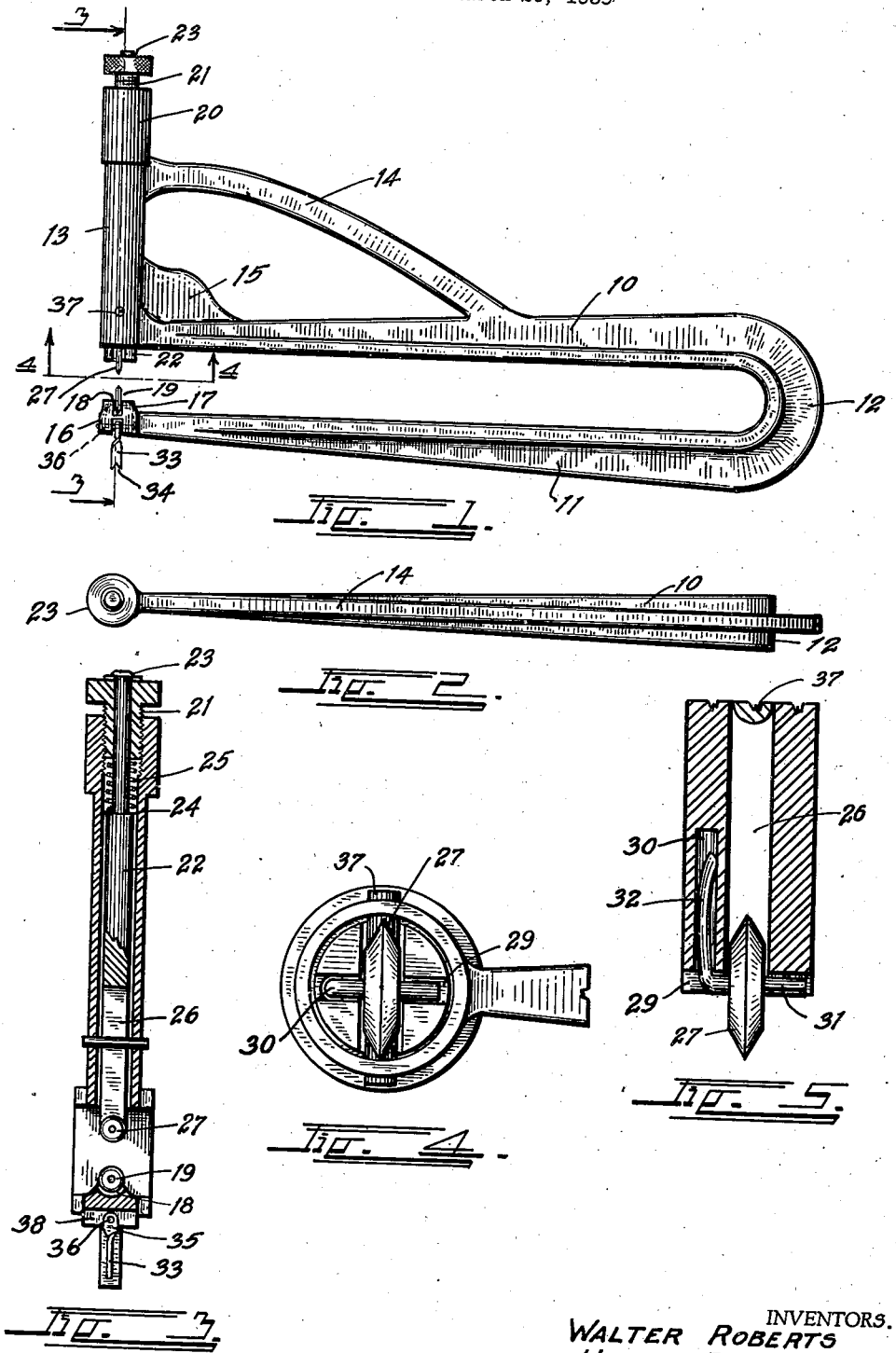
INVENTORS.
WALTER ROBERTS
BY HARRY ROBERTS
ATTORNEY.

Patented Dec. 9, 1941

2,265,955

UNITED STATES PATENT OFFICE 2,265,955

DOUBLE GLASS CUTTER

Walter Roberts and Harry Roberts, Denver, Colo.

Application March 20, 1939, Serial No. 263,044

1 Claim. (Cl. 49—52)

This invention relates to a device for cutting glass and is more particularly designed to cut "shatter-proof" glass. The so-called "shatter-proof" glass consists of two sheets of glass cemented to a central sheet of transparent flexible material such as nitro-cellulose or Cellophane. In cutting a sheet of "shatter-proof" glass with a standard glass cutter, the cutting wheel is run along one side of the glass to cut one sheet thereof, the pane is there turned over, and the wheel is run along the other side to cut the other sheet. If the second cutting line is not exactly over the first, an irregular broken edge will result.

The principal object of this invention is to provide a glass cutter which will accurately and efficiently simultaneously cut both sheets of a pane of shatter-proof glass at one operation with both cutting lines in accurate register with each other.

Other objects are: to provide a glass cutter in which the pressure of the cutting wheels against the glass will be uniform throughout the entire cutting operation; in which the pressure can be regulated for different thicknesses of glass; and in which the wheels can be easily and quickly mounted in and removed from the device.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a side view of the improved glass cutter.

Fig. 2 is a plan view thereof.

Fig. 3 is an enlarged longitudinal section through the cutter taken on the line 3—3, Fig. 1.

Fig. 4 is an enlarged fragmentary section taken on the line 4—4, Fig. 1.

Fig. 5 is an enlarged detail view of the wheel mounting mechanism employed in this invention.

The improved glass cutter includes a frame consisting of an upper arm 10 and a lower arm 11 joined together at their one extremities by a connecting portion 12 to form a complete, rigid, U-shaped frame. The arms and connecting portion are preferably T-shaped in cross-section. The other extremity of the arm 10 carries a vertically positioned tubular portion 13. Extending from the upper end of the portion 13 downwardly to the arm 10 is a conveniently located handle portion 14. Below the handle 14, between the tubular portion 13 and the arm 10, a web-like thumb and finger rest 15 is formed.

The free extremity of the arm 11 is provided with a rounded head 16 which is positioned directly below the tubular portion 13. The round head 16 is provided with an upwardly extending boss 17. The boss is cut with a groove 18 for receiving a glass cutting wheel 19. The wheel 19 is mounted in the groove 18 in a manner to be hereinafter described.

The tubular portion 13 has an enlarged upper extremity 20 which is internally threaded to receive an externally threaded adjusting bushing 21. Through the bushing 21 and the tubular portion 13 passes a round, solid, wheel shaft 22 which is provided, between its extremities, with a shoulder 24. A compression spring 25 acts against the shoulder 24 and the bushing 21 to constantly urge the wheel shaft downwardly in the portion 13. However, the wheel shaft 22 is prevented from passing all the way through the bushing 21 and the portion 13 by an enlarged head 23 formed on its upper extremity which rests against the bushing 21. The downward movement of the shaft is thus limited, but the shaft can be forced upwardly until the spring 25 is completely compressed.

The lower extremity of the wheel shaft is bifurcated as shown at 26. This bifurcation is directly above the groove 18 formed in the boss 17. In the end of the shaft, at right angles to the bifurcation 26, a groove 29 is formed. In the groove 29, at one side of the bifurcation 26, is a perpendicular socket 30.

The wheel 27 revolves on an L-shaped member which is formed by bending a stiff wire to form an axle 31 and stem 32 which is curved as shown in Fig. 5. The wheel 27 is mounted in the bifurcation 26 by inserting the stem 32 into the perpendicular socket 30 and by placing the axle 31 of the wire in the groove 29. Since the stem is curved, it is firmly wedged in the socket 30 to securely hold the wheel in place.

The wheel shaft is prevented from rotating in the member 13 by means of a stopping pin 37 which passes through the bifurcation 26 and enters the sides of the portion 13.

The wheel 19 is mounted in the groove 18 in the boss 17 in the same way as the wheel 27 is mounted in the wheel shaft 22. The wheel 19 enters the groove 18; an axle part of a second L-shaped member rests in a groove in the boss 17 which is at right angles to the groove 18; and a stem part of the L-shaped member enters a perpendicular socket in the boss 17.

Since the groove 18 is in alignment with the bifurcation 26, the wheels 19 and 27 are constantly held directly above each other so that when a sheet of glass is run between the cutting wheels, it will be cut on both sides with both cutting lines in accurate register with each other.

To aid an operator of the improved glass cutter to accurately follow a pattern, a guide member 33 depends from the bottom of the head 16. The guide member is notched as shown at 34, and is provided with a loop 35. The loop 35 surrounds a pin 36 which is secured at right angles to a notch 38 in the bottom of the head so that the apex of the notch is held directly below the glass cutting wheels 19 and 27.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

A glass cutting device comprising: an upper wheel supporting member; a lower wheel supporting member; a U-shaped frame connecting said wheel supporting members together, and holding them in a position one above the other; means for supporting a glass cutting wheel in each of said supporting members; means for varying the distance between said wheels; and a guide member depending from said lower supporting member immediately below the glass cutting wheel therein.

WALTER ROBERTS.
HARRY ROBERTS.